US008423733B1

(12) United States Patent
Ozdemir

(10) Patent No.: US 8,423,733 B1
(45) Date of Patent: Apr. 16, 2013

(54) SINGLE-COPY IMPLICIT SHARING AMONG CLONES

(75) Inventor: Kadir Ozdemir, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 467 days.

(21) Appl. No.: 12/753,262

(22) Filed: Apr. 2, 2010

(51) Int. Cl.
*G06F 12/00* (2006.01)
(52) U.S. Cl.
USPC .................................. 711/162; 711/E12.028
(58) Field of Classification Search .......................... None
See application file for complete search history.

(56) References Cited

U.S. PATENT DOCUMENTS

| 6,311,193 B1 * | 10/2001 | Sekido ................................. 1/1 |
| 7,849,057 B1 * | 12/2010 | Kazar et al. .................. 707/639 |
| 2005/0114402 A1 * | 5/2005 | Guthrie, II .................... 707/200 |
| 2011/0161381 A1 * | 6/2011 | Wang et al. ................... 707/814 |

* cited by examiner

*Primary Examiner* — Edward Dudek, Jr.
*Assistant Examiner* — Sean D Rossiter
(74) *Attorney, Agent, or Firm* — Campbell Stephenson LLP

(57) ABSTRACT

Various systems and methods are disclosed to share a single copy of a storage object among clones. For example, one method involves creating a first and second clone. The first and second clones share a single copy of a storage object. The first clone is assigned an identifier based on the value of a variable. After creating the first clone the variable is incremented. The second clone is assigned the value of the incremented variable as an identifier.

17 Claims, 10 Drawing Sheets

SINGLE-COPY IMPLICIT SHARING AMONG CLONES

FIELD OF THE INVENTION

The present invention relates to data storage and retrieval generally and more particularly to systems and methods for sharing data among data structure clones.

BACKGROUND OF THE INVENTION

Many data systems use clones. Clones can be used for variety of purposes including virtual machine boot image cloning, data recovery, data mining, backup, and testing. A clone is a point-in-time copy of a base data storage object. A storage object is a logical collection of data and is typically divided into logical blocks. In some systems clones can also be updated. That is, the clones are writeable. A desirable property of clones is space-efficiency. That is, a clone and its base can "share" data of the storage object that has not changed since the clone was created.

In a system having multiple clones, where each clone can be cloned, keeping track of the data stored and shared by each clone can become complicated. Some systems use b-trees to keep track of the data stored by a system's clones. A b-tree stores mappings between a logical address space and a physical address space. For example, a b-tree mapping can map a logical block of a file to a physical storage location of a physical volume. By accessing a b-tree, a user can determine the physical location of the logical blocks of a clone's storage object.

SUMMARY OF THE INVENTION

Various systems and methods are disclosed to share a single copy of a storage object among clones. For example, one method involves creating a first and second clone. The first and second clones share a single copy of a storage object. The first clone is assigned an identifier based on the value of a variable. After creating the first clone the variable is incremented. The second clone is assigned the value of the incremented variable as an identifier.

In an embodiment, an epoch value is assigned to a data block of the storage. The epoch value assigned depends on whether the first clone has any child clones. If the first clone does not have child clones, the epoch value assigned to the data block is the first clone identifier. If the first clone does have child clones, the epoch value assigned to the data block is the clone identifier of the first clone's most recently created child clone.

In an embodiment, if the data block does not have a min epoch value, a min epoch value that equals the epoch value is assigned for the data block. The min epoch value indicates the earliest time the data block was written.

In an embodiment, the epoch value and min epoch values are stored in a b-tree node. The b-tree includes mapping information for the first and second clone. The b-tree node can also store an additional epoch value and min epoch value for a data block of the second clone.

In an embodiment, a request to access a data block specifies the first clone identifier and a logical block address (LBA). Using the LBA as a primary index and the first clone identifier as a secondary index, it is determined whether a b-tree node includes mapping for the data block.

In an embodiment, a clone is selected by performing a depth first traversal of the clone family tree. Shared data is copied to a physical location specified by a b-tree node that stores mapping information for the selected clone and the b-tree node is updated.

In an embodiment, a target clone is deleted and a child clone of the target clone is promoted. In an embodiment, a clone comprises a writeable snapshot of a base storage object and the storage object can be a file or a thin provisioned volume.

The foregoing is a summary and thus contains, by necessity, simplifications, generalizations and omissions of detail. Those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
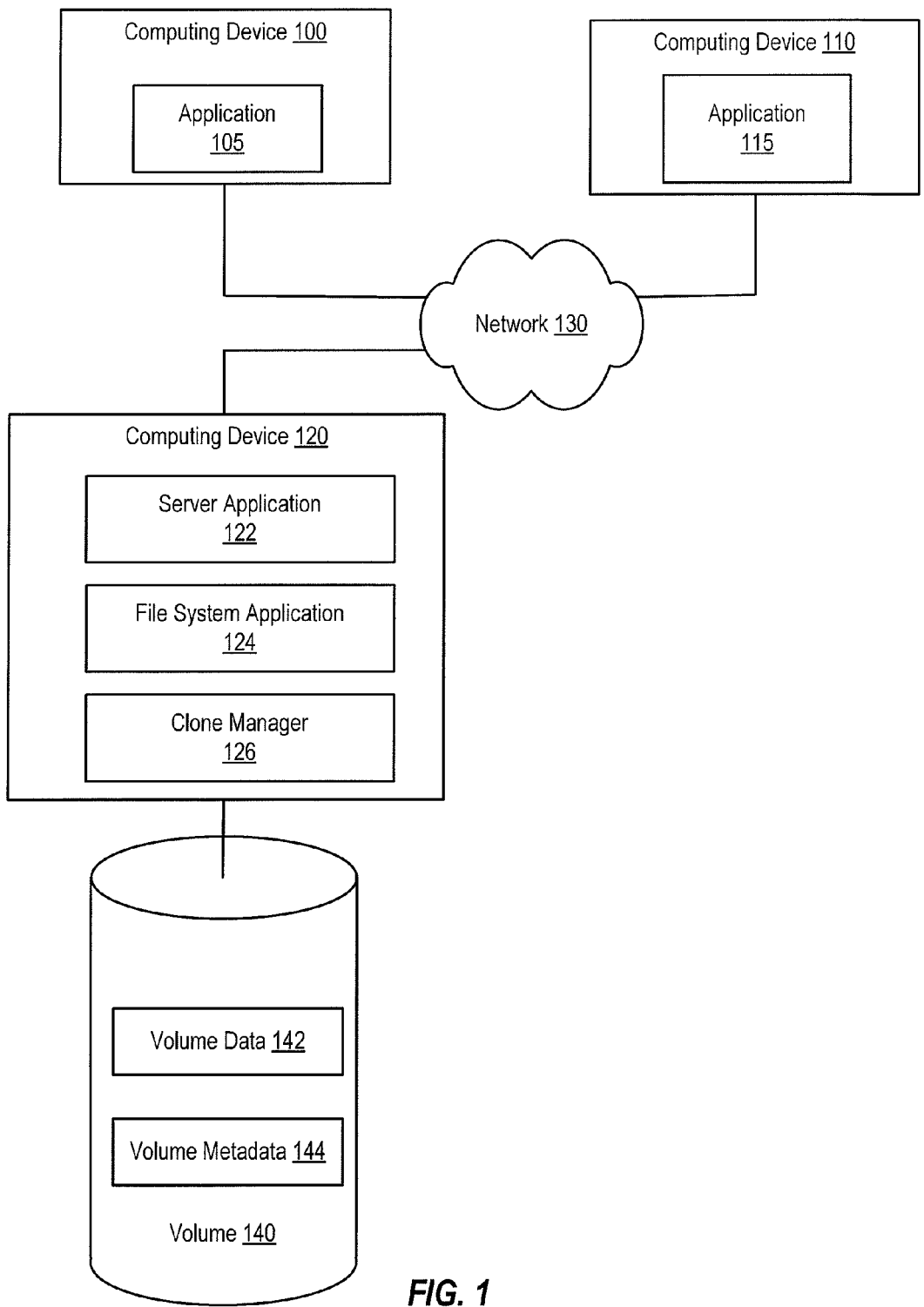
FIG. 1 is a block diagram of a system that implements implicit sharing of a single copy among clones, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Various systems and methods are disclosed to provide space and I/O efficient clones. Space efficiency is achieved by storing exactly one physical copy of each shared block regardless of the form of the relationships among clones. I/O efficiency is achieved by using a single b-tree for a family of clones rather than a separate b-tree for each clone, without maintaining a reference count for or multiple pointers to a shared block.

A clone management system, according to one embodiment, enables multiple clones to share a data stored in storage object. The clone management system insures that only a single physical copy of the storage object's data exists at any one time. The clone management system also uses a single b-tree as an index for the multiple clones. The single b-tree includes index information for each of the storage object's logical blocks that have been written, regardless of which clone actually stores the written logical blocks. The clone management system operates with increased efficiency by only having a single copy of a shared logical block and only accessing a single index to determine where a logical block is physically located.

One way to create a clone from a base storage object is to simply create a copy of the base storage object. This would involve allocating physical storage space for the clone and copying data from the base storage object's physical storage space to the clone's physical storage space. This approach involves allocation of double the space of the base storage object and further takes additional time and processing to duplicate the storage object.

A storage object can have multiple clones. For example, a storage object can be cloned daily for backup. Since clones are also writable objects, a clone can be updated and cloned too. Therefore the relationship between clones can be represented by a tree. If storage object x is cloned from storage object y then x is a clone (or child) of y and y is the base (or parent) object for x. This tree is called a clone-family tree. The terms storage object and clone are used interchangeably. Any storage object within a clone family is referred as clone including the root. When multiple clones of a storage object are created, maintaining a full copy of the storage object's data for each clone becomes simply infeasible for most applications due to its excessive storage space requirement.

One approach for reducing space requirements is to implicitly share the base storage object's data with the base storage object's clones. Multiple clones can be created and the clones and the base storage object can all share a single copy of the same data. However, when the base storage object's data is modified, the modified data is not shared with clones created before the modification. A clone only shares data existing when the clone was created. Similarly, if a clone has been written to, clones of the clone share the data. If the data stored by the clone is subsequently updated, the clone's clones no longer share the data.

Prior to overwriting the base storage object's data with modified data, the base storage object's pre-modification data can be copied, or pushed, to a clone. This allows clones created before the base storage object's data was modified and any clones made from those clones to continue to share the base storage object's pre-modification data. Although this approach is very efficient for saving space, it has been successful only when creating clones of clones is not allowed. In other words, it is effective when the clone family has only two levels, i.e., the base object and its immediate clones. There is no known solution for maintaining single copy of the same data when creating clones of clones are permitted. The known implicit cloning methods start to duplicate data in this general case. Therefore, in some systems in which clones can share data, situations arise in which multiple copies of the same data are made.

Another approach is to explicitly share the same data among clones by using a method of cloning that involves shadowing. In a shadowing system, when the same data is shared by multiple clones, a pointer to this data is maintained for each clone and when an update is made to a shared block through a clone, space is allocated for a copy of the block for the clone and the rest of the clones continue pointing to the existing shared data. Shadowing systems suffer from several infirmities. For example, shadowing systems typically maintain a b-tree for each clone that is shadowed. In systems with multiple clones, multiple b-trees are used. In order to access a storage object for a given clone, the clone's b-tree is accessed to locate the physical storage that stores the data that makes up clone's storage object. Accessing a b-tree typically includes performing input/output (I/O) operations to read data from, and in the case of an update, write data to, the b-tree in memory. In order to access storage objects for multiple clones, multiple I/O operations are used to access the multiple b-trees associated with these clones.

Shadowing systems typically also maintain reference counters for each data block that indicates how many clones are sharing a given block. The system then increments and decrements the counters whenever clones are added or data blocks are modified. Additional storage space is therefore used to store the reference counters and additional I/O operations are performed to access and update the counters. Systems that employ shadowing also typically store pointers pointing from each clone that is sharing a block to the clone that actually stores the block. When changing the location of the block is needed (e.g., due to garbage collection, defragmentation, or moving data to a different tier of storage), the pointers for each clone that is sharing the storage object also are be updated. Pointer modification uses further I/O operations, which exacerbates the problem when, as is commonly the case, the clones are stored in various memory locations in a volume. Updating each clone involves locating the clone in the volume memory and accessing the clone. As can be seen, systems that employ shadowing can involve a relatively large number of I/O operations to update clone data. Such I/O operations are considered overhead cost and reduce the performance of a system. Thus, this type of clone management leads to inefficient use of computing resources, both in terms of the additional needed storage space and in terms of the additional I/O operations used. Embodiments of the present invention seek to minimize the inefficiencies of the existing methods by disclosing an implicit sharing method that stores exactly one physical copy of each shared block regardless of the number of the levels in or the shape of the clone family tree representing the relationships among clones, without using per-clone pointers to the shared blocks and without maintaining reference counts.

FIG. 1 is a block diagram of a system that implements implicit sharing of a single copy of a storage object among clones, according to one embodiment. As shown, the system includes computing device 100, computing device 110, and computing device 120. Computing devices 100 and 110 implement applications 105 and 115, respectively. Computing device 120 implements server 122, file system 124, and clone manager 126. In one embodiment, file system 124 is implemented using the Veritas File System™ family of products, available from Symantec, Corp. of Cupertino, Calif.

In the example of FIG. 1, computing device 100, computing device 110, and computing device 120 are coupled by a network 130. Network 130 can include one or more storage, local, and/or wide area networks. Network 130 can be implemented using various topologies, communication protocols, and physical links (e.g., wireless links, coaxial cables, and the like). In some embodiments, certain components may be directly connected, as opposed to being connected via a network.

Server 122 is a software application that provides one or more services to clients. The services provided by server 122 can include data access and retrieval (e.g., if server 122 is a web server, database server, or file server). Server 122 can implement business logic to perform various business functions. For example, server 122 can provide search engine functionality, email services, data collaboration and/or portal management services, directory services, or any other desired functionality. In one embodiment, server 122 interacts with file system 124 to process requests from applications 105 and 115.

As shown in the example of FIG. 1, Applications 105 and 115 are clients of server 122. Applications 105 and 115 can be instances of the same application or different applications. For example, application 105 can be an email program and application 115 can be a database program. Server 122 writes data to and retrieves data from volume data 142. Volume data 142 stores data that is provided to and/or received from clients by server 122, as well as data generated and/or consumed by server 122 in the process of managing the other data being provided to and/or received from clients. Volume data 142 is stored in volume 140. Volume 140 is a storage device that is accessible to server 122. Volume 140 can be implemented using any storage technology, including hard disks, RAM disks, optical disks, tape or other media. Volume 140 can be solid state memory (e.g., a Flash memory device), magnetic storage (e.g., hard disks or tapes), and/or optical storage (e.g., digital versatile discs (DVDs) and/or compact discs (CDs)), or groups of multiple such storage devices (e.g., optical storage jukeboxes, tape libraries, hard disk arrays such as just a bunch of disks (JBOD) arrays or redundant array of independent disks (RAID) arrays, and the like).

File system 124 is configured to manage data stored in volume data 142. File system 124 organizes volume data 142 into logical groupings, such as files and directories. A directory is a special type of file. A logical grouping (e.g., file) can include one or more logical blocks. A logical block is accessible via a logical block address (LBA).

Volume data 142 is stored in physical locations known as blocks. Data blocks are grouped logically into storage objects. A storage object is used to persist and retrieve data in logical blocks for applications such as file systems and databases. A storage object can also store an entire file system or database, or portions of file systems and databases, such as files, tables, sub-files, and sub-tables. Each storage object (e.g., file) has a portion of physical storage space (e.g., in volume 140) allocated to store the storage object. The storage object is mapped to a particular set of physical locations or blocks. In one embodiment, such mapping is performed dynamically. That is, file system 124 can specify that a given amount of physical storage space be reserved for a particular storage object. For example, file system 124 can specify that 1 gigabyte be allocated for file A. Generally the physical space allocated includes one or more physical storage blocks of fixed size that are not sub-divided. Thus, the amount of space allocated (in terms of blocks) may not exactly match the amount of data to be written.

For example, if file A is created, file system 124 may not reserve a particular range of physical addresses to store the blocks of file A. In this case, the space is allocated for file A incrementally when the data is actually stored on file A. An application can randomly write any offset of file. The highest offset determines the size of the file. File system 124 may report that size of the file is 500 megabytes and may not reserve a particular range of addresses for the 500 megabytes of file A which are not yet used. If file A grows (e.g., an additional 100 megabytes of data is written to file A) file system 124 will allocate (reserve) additional physical addresses for the additional 100 megabytes of data once the additional 100 megabytes of file A is to be written. This is known as dynamic mapping and file A is known as a thin provisioned (or sparse) storage object.

Volume 140 also includes volume metadata 144. Volume metadata 144 includes information about volume data 142, such as location and age of various elements of volume data 142, as well as information about the relationships between various elements of volume data 142. For example, metadata 144 can include information that identifies parent-child relationships between clones. In one embodiment, volume metadata 144 includes a b-tree that provides logical-to-physical mappings for the logical objects stored in volume data 142.

Volume data 142 includes original data and clone data. Clone manager 126 is configured to manage one or more clones. Clone manager 126 can be implemented as a stand alone application coupled to file system 124. Alternatively, clone manager 126 can be included as a module within file system 124. In the embodiment shown in FIG. 1, clone manager 126 is coupled to file system 124. In conjunction with file system 124, clone manager 126 is configured to create, update, delete, store, and access one or more clones stored in volume data 142, as well as being configured to create, update, delete, store, and access metadata stored in volume metadata 144.

A clone is a copy of original data at a given point in time. A clone serves as backup data that can be used in the event of failure of computer systems, networks, or communication links, or for recovery from any other corruption of original data. When a clone is created, no data is copied into the clone. After one or more clones are created, when original data is modified, the original data is copied to one of the clones. Such a write operation is referred to as a copy on write (COW) operation. When original data is modified, there is some shared data (e.g., logical blocks). These logical blocks are unmodified logical blocks in the original data. The logical blocks in the original that are modified are "pushed" to a clone, and are not shared. Sharing blocks means that there is only one physical copy of a block, though the block is logically included in multiple places, e.g., the original data and the clone. A shared block can be accessed either through the original data or through the clone.

Figure 2:
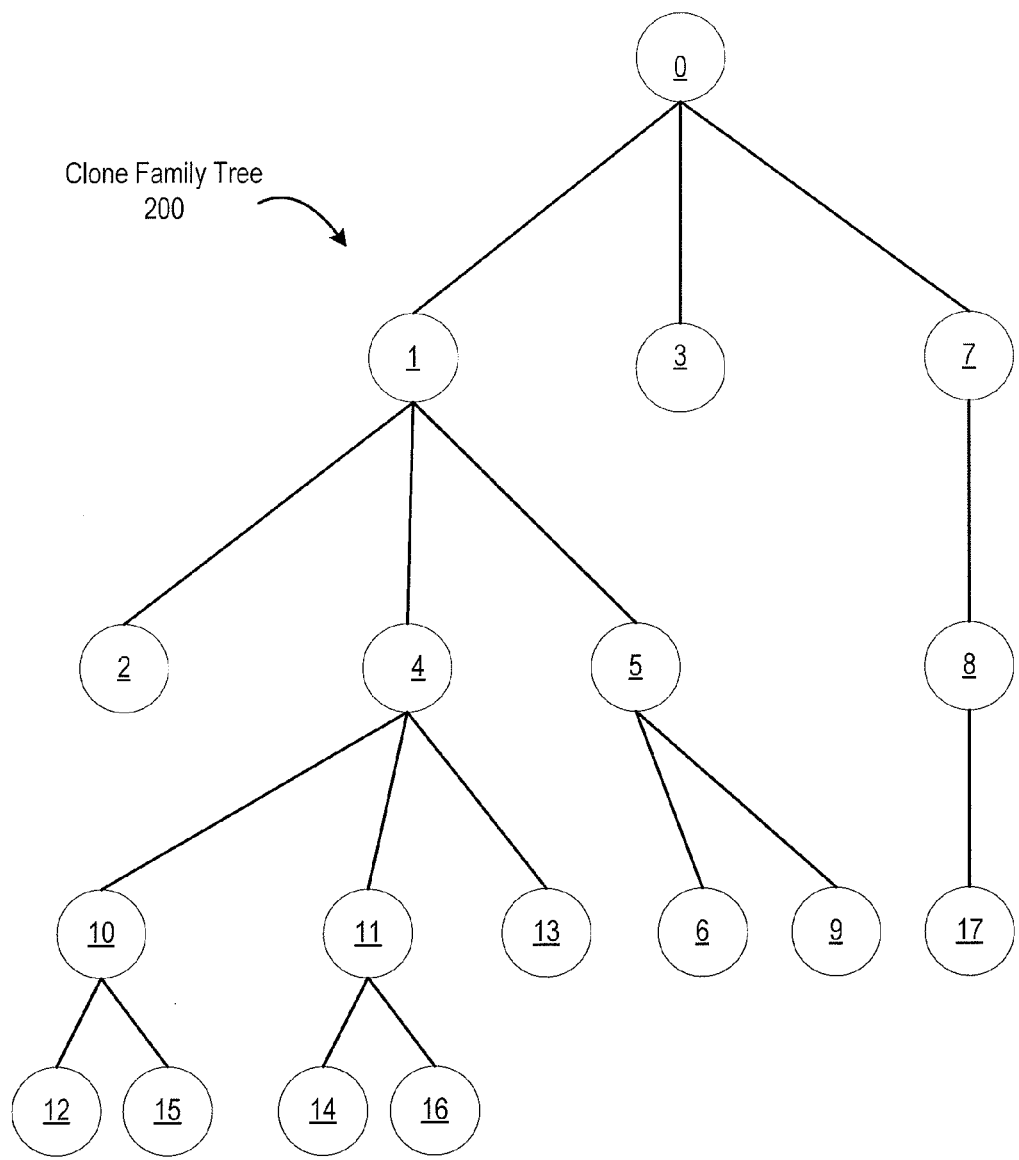
FIG. 2 is a block diagram of a clone family tree, according to one embodiment of the present invention.

FIG. 2 is a block diagram of a clone family tree, according to one embodiment of the present invention. Clone family tree 200 illustrates a clone family. Each clone represents a storage object. The storage object is a logical object, such as a file or file system. The storage object can include one or more logical blocks. Each logical block of the storage object is mapped to one or more physical data blocks where the data for the logical block is actually stored.

Clone family tree 200 is a hierarchical structure that represents relationships between the clones. In this example, clone 0 is the root of clone family tree 200 and is the parent clone of clones 1, 3, and 7. Clones 1, 3, and 7 are child clones of clone 0. All of the clones in clone family tree 200 are descendants of clone 0, either directly (as in the case of clones 1, 3, and 7) or indirectly (as in the case of all other illustrated clones). Exactly one physical copy of each shared block is stored in clone family tree 200, regardless of the shape of the tree representing the relationships among clones.

Each clone in a clone family has a unique clone ID within the clone family. Clone family tree 200 includes clones having clone IDs from 0 to 17. In one embodiment, the clone IDs are assigned to clones using a monotonically increasing integer counter called an epoch counter. A counter is maintained in metadata (such as volume metadata 144 of FIG. 1) for each clone-family tree. The counter starts at 0 and is incremented each time a clone is added to the clone family tree. The first clone in a clone family (i.e., the root) gets clone ID 0. The next clone in the clone family gets 1, and so on. Thus, one property of a clone family is that the clone ID of a clone is less than the clone ID of any of its descendants.

The value of the epoch counter at any given time is known as the epoch value. Each data block in the clone family is associated with an epoch value. An epoch value is assigned to a data block when the data block is written on a clone, and is not updated later, even when the data block is copied from one clone to another. The epoch value assigned to a data block may be less than the current value of this counter.

A clone is referred to as the source for a given data block if the data block is initially written on this clone. That is, if the first time a data block is written, the data block is written to clone 0, clone 0 is the source of the data block. The epoch value for a data block is the clone ID of the source clone of the data block if the source clone has no child clone when the data is written, and the clone id of its most recently created child clone (i.e., the rightmost child of the parent clone) otherwise. For example, if a data block is written to clone 1 prior to creation of clone 2, the epoch value for the data block is 1. If a data block is written to clone 1 after the creation of clone 3, but prior to the creation of clone 4, the epoch value for the data block is 2 (since 2 is the clone ID of clone 1's most recently created child clone).

Figure 3A:
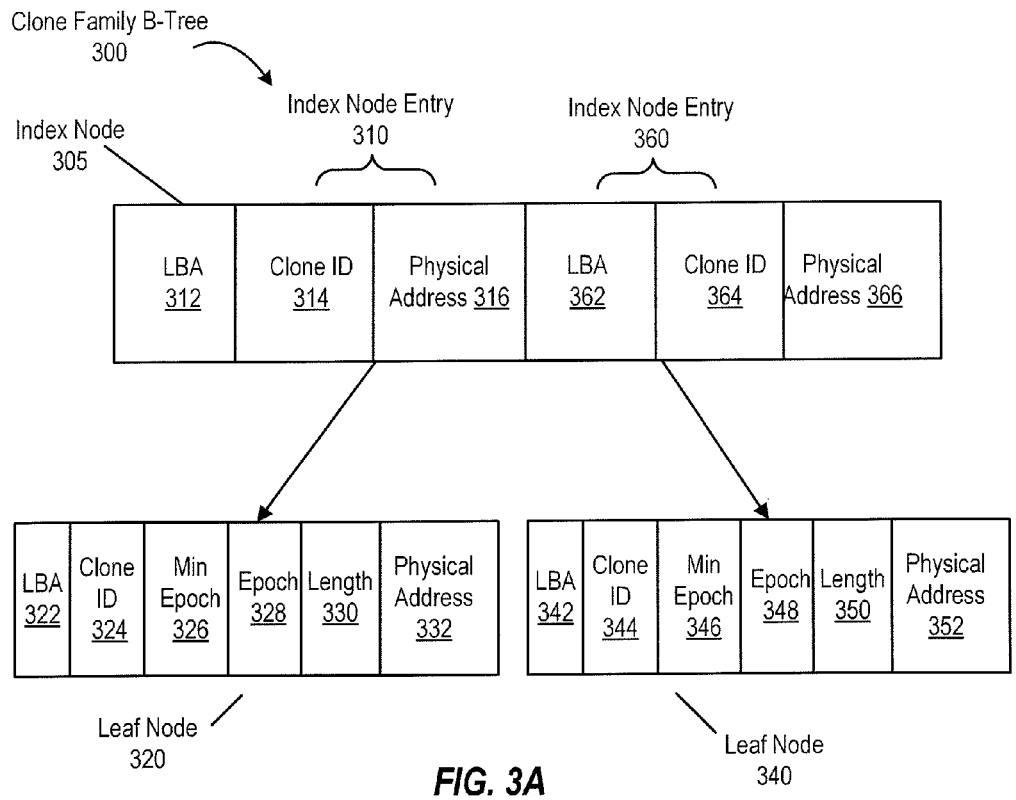
FIG. 3A is a block diagram of a clone family b-tree, according to one embodiment of the present invention.

FIG. 3A is a block diagram of clone family b-tree 300, according to one embodiment of the present invention. The b-tree includes the logical-to-physical mappings for all clones in the clone family tree. A clone manager (such as clone manager 126 of FIG. 1) can access a clone family b-tree to detect a physical address in a physical storage device (such as volume 140 of FIG. 1) at which a logical block is stored. In this embodiment, I/O efficiency is achieved by using a single b-tree for a clone family tree (such as clone family tree 200 of FIG. 2) rather than a separate b-tree for each clone. This reduces the number of I/O operations performed to locate and modify mappings between a clone's logical block and the physical storage space where the logical block is stored. The clone family b-tree can be stored in the physical storage device (e.g., in volume metadata 144 of FIG. 1) or in local memory (such as in a cache (not shown) in computing device 120 of FIG. 1). When a logical block is written, a new logical-to-physical mapping is created and a new entry is added to a b-tree leaf node.

Regardless of the number of clones sharing the same data at a given logical block address, the method described here stores exactly one physical copy of this data. This data is stored in one of the clones sharing it. It is stored on the clone that is visited first in the depth-first traversal of the clone-family tree. If a block of data needs to be overwritten on clone c then the data is pushed to the next clone visited during depth-first traversal starting from clone c such that this clone shares the data. During depth first traversal starting at clone c, first clone c is visited, then the leftmost child and its descendants are visited, and then the next right child (of clone c) and its descendants are visited. This process continues until all children and their descendants are visited. For example, during the depth first traversal starting at the root of the clone-family tree in FIG. 2 is the clones are visited in the following order: 0, 1, 2, 4, 10, 12, 15, 11, 14, 16, 13, 5, 6, 9, 3, 7, 8, 17. This order will be simply referred as depth-first order. For example, if clones 1, 5, 13 and 16 share a block of data then the data is stored on clone 1 initially. If this data needs to be overwritten through clone 1 then the data is pushed to clone 16. This data push will be referred as push operation. Thus, the depth-first order will be used to identify the destination clone for the push operation (i.e., the new place to store the share data). The data that is pushed to a clone will be referred share data. The data directly written to a clone directly by the application will be referred as written data.

A b-tree is a hierarchical structure where there can be multiple levels. The number of levels depends on the size of the mapping (e.g., the number of leaf entries). If there are n levels in the b-tree then the first n−1 levels are for index nodes. In this case, searching for a leaf entry (i.e., finding out the mapping from an LBA to a physical block address) involves visiting n−1 index nodes where the last visited index node will point to the leaf node in which the mapping entry (i.e., the leaf node entry) sought may be included.

Clone family b-tree 300 includes an index node 305 having index entries 310 and 360 and leaf nodes 320 and 340, each having one entry. While leaf nodes 320 and 340 are shown with a single entry, it will be understood that the leaf nodes are not so limited. Both index nodes and leaf nodes can include multiple entries. For example, it is very common that the size of an index or leaf node is 4096 bytes. An entry for an index node can be, for example, 20 bytes (8 bytes for LBA, 4 bytes for clone 1D, and 8 bytes for physical address). In this example, an index node can have more than 200 entries. Similarly, an entry of a leaf node, in one example, can be 32 bytes and there can be more than 100 such entries in the leaf node.

Index node entry 310 includes a logical block address (LBA) 312, a clone ID 314, and a physical address 316. Index node entry 360 includes an LBA 362, a clone ID 364, and a physical address 366. Logical block address and clone ID are the primary and secondary key, respectively, for the clone-family b-tree. The physical address is the address of a b-tree node at the next lower level in the b-tree and is represented by an arrow from an index node entry to the b-tree node. In order to identify the physical storage locations that store data for a particular logical block, a clone manager searches a b-tree leaf node for a given LBA and clone ID. The clone manager uses a b-tree index node to detect which leaf node to search.

Each entry in a leaf node contains information concerning a logical-to-physical mapping for a clone's extent (e.g., range of blocks) as well as information concerning when the content of this range of blocks is written (i.e., the epoch value for this range), if any content for this range from an ancestor of this clone has been pushed to this clone or one of its descendant, and if so when (i.e., the min epoch value for the range). Leaf node 320 includes the following fields: LBA 322, clone ID 324, min epoch 326, epoch 328, length 330, and physical address 332. The value in LBA 322 is the LBA for the clone's logical block. In embodiments in which the clone stores multiple logical blocks, the LBA field contains the LBA of the first logical block stored by the clone. Clone ID 324 stores the clone's ID. This is the value of the epoch counter when the clone was created.

Min epoch 326 stores the minimum epoch value for the data that is currently or was once stored at this logical block by the clone or a descendant of the clone. If the min epoch value for a logical block stored at a clone is less than the clone ID of the clone, then either the clone or a descendant of the clone has stored data for this logical block that was pushed by an ancestor of the clone. If the min epoch value of the logical block stored on the clone is equal to the epoch value of the logical block stored on the clone then the data currently stored in the clone's logical block was pushed to the clone by an ancestor of the clone or the data was originally written to the clone. The min epoch value represents the oldest (earliest) data that is or was stored by this clone or a descendant of this clone.

Logically an epoch counter is maintained for each clone. The epoch counter is set to the ID of the clone when the clone is created. Each time a new child clone is cloned from this clone, the epoch counter is set to the ID of the child clone. Epoch 328 holds the value of the epoch counter of the clone on which the data stored at the range of blocks starting at LBA 322 is first written, at the time when the data was written. The clone on which the data is currently stored may not be the clone on which the data is first written as the data may be pushed from an ancestor clone. In some embodiments, epoch and min epoch are discussed as though the clone whose clone ID is stored at clone ID 324 comprises a single logical block. However in some embodiments the clone comprises multiple logical blocks. In those embodiments, the same respective values for epoch and min epoch are assigned for each logical block in the multiple logical blocks. In those embodiments, length 330 stores the number of logical blocks in a sequence of logical blocks. In the example where the clone stores a single logical block, length 330 is 1. Physical Address 332 stores the starting physical address where the logical block(s) is actually stored. Leaf node 340 includes similar fields as leaf node 320 and the description of these fields is omitted for the sake of brevity.

Figure 3B:
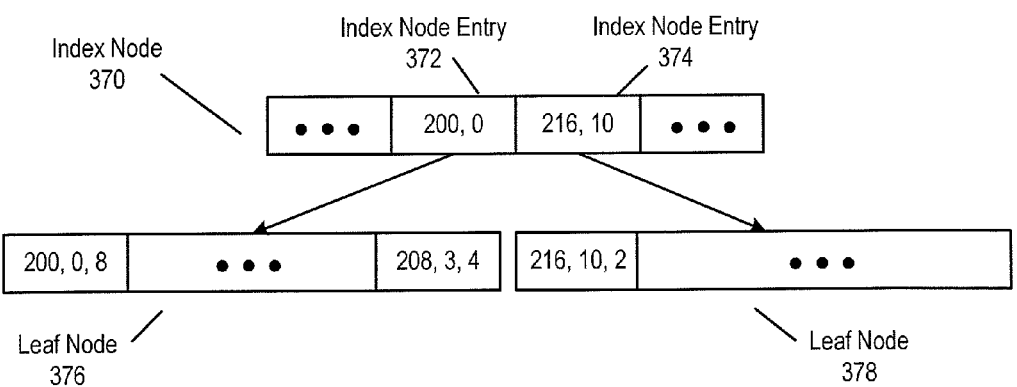
FIG. 3B is a block diagram of another example of a clone family b-tree, according to one embodiment of the present invention.

FIG. 3B shows a clone family b-tree, according to one embodiment. FIG. 3B shows leaf nodes 376 and 378 and index node 370. The leaf node entries show starting logical block address, clone id and length fields. The other fields, i.e., min-epoch, epoch, and starting physical block address are omitted for the sake of simplicity. The block range for leaf node 376 is 200 through 215. Logical-to-physical mappings for logical blocks 200 through 215 are stored in leaf node 376. Logical-to-physical mappings for logical blocks having LBAs greater than 215 are stored in leaf node 378.

In one example, when a clone manager receives a request to access a logical block, the request specifies an LBA and a clone ID. In this example, the clone manager detects the specified LBA from the request and accesses index node 370. If the request specifies an LBA between 200 and 215, the clone manager accesses leaf node 376 to detect the physical address of the logical block. If the request specifies an LBA greater than 215, the clone manager accesses leaf node 378 to detect the physical address of the logical block. When the clone manager locates an entry that has an LBA that matches the specified LBA, the clone manager compares the specified clone ID with the clone ID of the entry. If the clone IDs match, the clone manager accesses data stored at the physical address stored in the entry. Otherwise, the clone manager continues to search the leaf node. For example, if the clone manager receives a request that specifies LBA 210 and clone ID 3, the clone manager accesses index node 370 and detects that mappings for logical blocks stored at LBA 210 are stored at leaf node 376. The clone manager finds an entry that has an LBA of 208 and a length value 4. The clone manager calculates that this entry includes a mapping for a logical block stored at LBA 210 (since the entry includes mappings for LBAs 208, 209, 210, and 211. If the specified clone ID is 3, the clone manager uses the mapping stored in this entry. If the specified clone ID is not 3, the leaf node does not include a mapping for the specified logical block. Using both LBA and clone ID as keys to an indexing data structure (e.g., clone family b-tree 300) facilitates finding a logical-to-physical mapping for a single logical block shared among a plurality of clones with a single indexing data structure.

Generally, the first LBA of a given clone-family b-tree leaf node is the value of the LBA of the first entry in the leaf node since entries in the leaf node are sorted based on LBA and clone ID. The last LBA of a given clone family b-tree leaf node is one less than the first LBA the leaf node to the immediate right of the given leaf node. The last LBA for the last leaf node in the b-tree is the allowed maximum value for a given clone (e.g., the size of the clone in blocks minus 1) Similarly the first LBA for the first node is the allowed minimum value (e.g., 0).

A clone-family b-tree will not include any pair of leaf nodes having entries with block ranges that overlap for the same clone. When a logical block or blocks of a clone is overwritten or removed, the old content is pushed to the first clone in the depth-first traversal that shares the logical block. This results in modifying or removing one or more entries from the b-tree leaf node that stores mappings for the clone and/or adding new entries. Since the LBA is the primary key for the clone-family b-tree, new entries are inserted in close proximity to the entries that are removed or modified. In some cases, these operations can be done without additional I/O operations because all these operations can be on the same leaf node.

A new entry to be inserted into a b-tree leaf node may include a block range that overlaps multiple b-tree leaf nodes. In this case, the block range is split into multiple block ranges to be aligned with the block ranges of the leaf nodes and therefore multiple entries are inserted into the b-tree. Splitting a b-tree leaf node may involve splitting some of its entries to make sure that their block ranges are fully covered by the block range of the leaf node. When an entry is split, the LBA, physical address, and length field are adjusted on the resulting entries. However, the other fields, i.e., the clone ID, epoch, and min epoch are not changed. For example, if a write to logical blocks 208 through 223 was received for the clone family tree indexed by the clone family b-tree shown in FIG. 3B, an entry would be added to leaf node 376 and a second entry would be added to leaf node 378, since leaf node 376 stores mappings for logical blocs having LBAs 200 through 215 and leaf node 378 stores mappings for logical blocks having LBAs greater than 215. Similarly, merging leaf nodes may result in merging their entries.

Since the clone-family b-tree is sorted based on LBA and clone ID, identifying all the blocks of a given clone may involve a full scan of all b-tree leaf nodes. In one embodiment, to eliminate the need for the full scan, a separate clone map b-tree is maintained for each clone to identify the clone-family b-tree leaf nodes that include at least one entry for the corresponding clone. The LBA is used as a key for the clone-map b-tree. A leaf node entry of a clone-map b-tree identifies a range of logical addresses such that every leaf node covered by this logical address range includes either at least one entry of the clone for the clone-map b-tree or the logical address in its first entry is the same as that of the first entry of another covered node that includes at least one entry of the clone. Therefore an entry holds a LBA and length field. Since the clone-map b-tree is sorted based on LBA and there will be no overlapping block ranges, adjacent block ranges in the logical address space are merged during insertions. This means that the number of entries in a clone-map b-tree can be much smaller than the number of entries for a given clone in the corresponding clone-family b-tree. The clone-map b-tree is mainly used when a clone is deleted to prevent a full scan of the clone-family b-tree. It can also be used to truncate a storage object or delete its blocks within a specified range. The entries in the clone-family b-tree leaf nodes identified by a clone-map b-tree are scanned sequentially in memory to find the entries for the corresponding clone.

When a clone-family b-tree leaf node is split, e.g., when a range of blocks is updated that spans two b-tree leaf node starting LBA values, one or more clone-map b-trees may need to be updated for the clones that have entries in the node. If a clone already has at least one entry in each half of the split then there is no need to update clone map b-tree for that clone. If the first half has no entry for a given clone but the second half has at least one entry, then the range for the first half is removed from and the range for second half is added to the clone-map b-tree.

When two leaf nodes in the clone-family b-tree are merged, if a clone has an entry in one node but no entry in the other then the range of the other node is inserted to the clone-map b-tree for this clone.

When there is only one storage object in a clone family (e.g., the root clone), a clone map b-tree for the object is not used. When the number of objects in the clone family becomes two (e.g., the first clone of the root is created), a clone map b-tree for both the root clone and the first clone is created. The clone map b-tree for the base includes one entry which covers the entire logical address space of the root clone. The clone map b-tree for the clone includes no entries initially.

The clone map b-tree may not be used if freed b-tree entries and logical blocks are reclaimed lazily. One way to implement a lazy delete mechanism is to delay the reclamation of a b-tree leaf node entry and the logical blocks for which the entry stores mapping information until the b-tree leaf node is accessed again as part of a regular clone read or write operation, and/or a background garbage collection process scans it.

Figure 4:
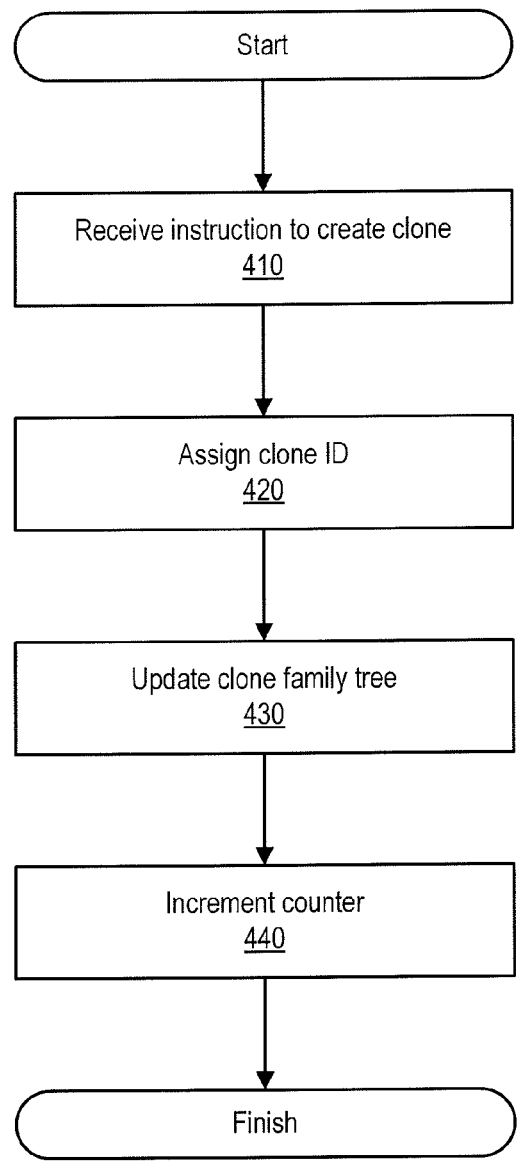
FIG. 4 is a flowchart of creating a clone, according to one embodiment of the present invention.

FIG. 4 is a flowchart of creating a clone, according to one embodiment of the present invention. FIG. 4 begins at 410 with receiving an instruction to create a clone, for example, by a clone manager (such as clone manager 126 of FIG. 1) from an application (such as application 105 of FIG. 1). The clone manager assigns a clone ID for the new clone at 420, by detecting the current value of the epoch counter and using that value as the clone ID. The clone manager then updates the clone family tree at 430, for example, by adding a metadata entry (for example to metadata 144 of FIG. 1) for the new clone. Each clone in the clone family tree has an entry in metadata that at least specifies the clone ID. At 440, the clone manager increments the epoch counter. The clone manager does not update the clone family b-tree upon creation of a new clone, but instead waits until data is written (directly or via a push) to the clone.

Figure 5:
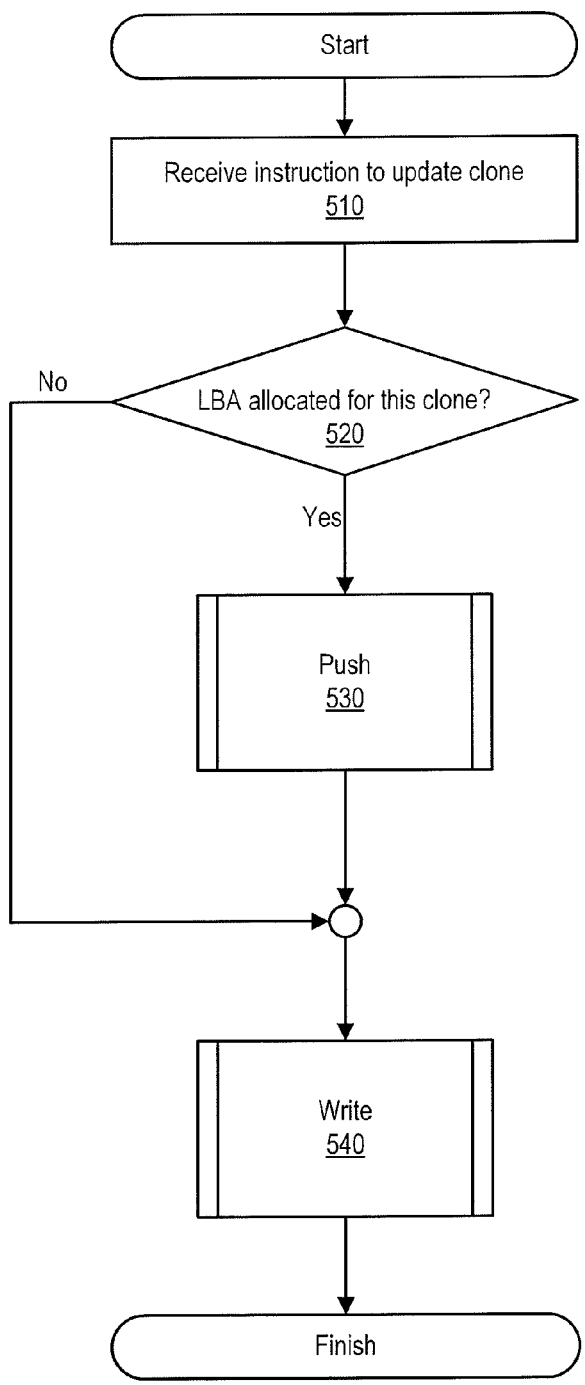
FIG. 5 is a flowchart of updating a clone, according to one embodiment of the present invention.

FIG. 5 is a flowchart of updating a clone, according to one embodiment of the present invention. In the following examples, it will be assumed that a clone is a copy of a storage object that includes a single logical block having a single LBA. That is, reference to updating or writing a clone is understood to mean updating the single logical block associated with the clone. This assumption is made for the sake of ease of explanation, and no such limitation exists in practice. In practice, a clone can include multiple logical blocks that can be updated independently or as a group.

The method begins at 510, with receipt of an instruction to update a clone. In one example, the instruction is received by a clone manager (such as clone manager 126 of FIG. 1). The instruction specifies a clone ID representing one of the clones in a clone family tree (such as clone family tree 200 of FIG. 2). The instruction also includes the LBA of the logical block stored (or shared) by the clone and a request to modify, copy, or delete the clone's logical block.

At 520, the clone manager detects whether the specified LBA is allocated for this clone. That is, the clone manager detects whether data for this logical block has previously been written to this clone and is currently stored by this clone. One way to detect whether an LBA is allocated is to access a clone family b-tree (such as clone family b-tree 300 of FIG. 3) and find the leaf node that stores mappings for the specified LBA. The clone manager can then detect whether the leaf node contains an entry for the specified LBA that includes the clone. If the LBA is allocated, then the clone is either the source for the logical block or the logical block has been pushed to this clone. In either case, the LBA is mapped to a physical location, and the logical block is stored at the physical location. The clone manager locates the logical block in physical storage by examining the logical-to-physical mapping stored in this clone's metadata. If the specified LBA is not allocated for the clone, the method proceeds to write process 540 (see FIG. 6).

Figure 7:
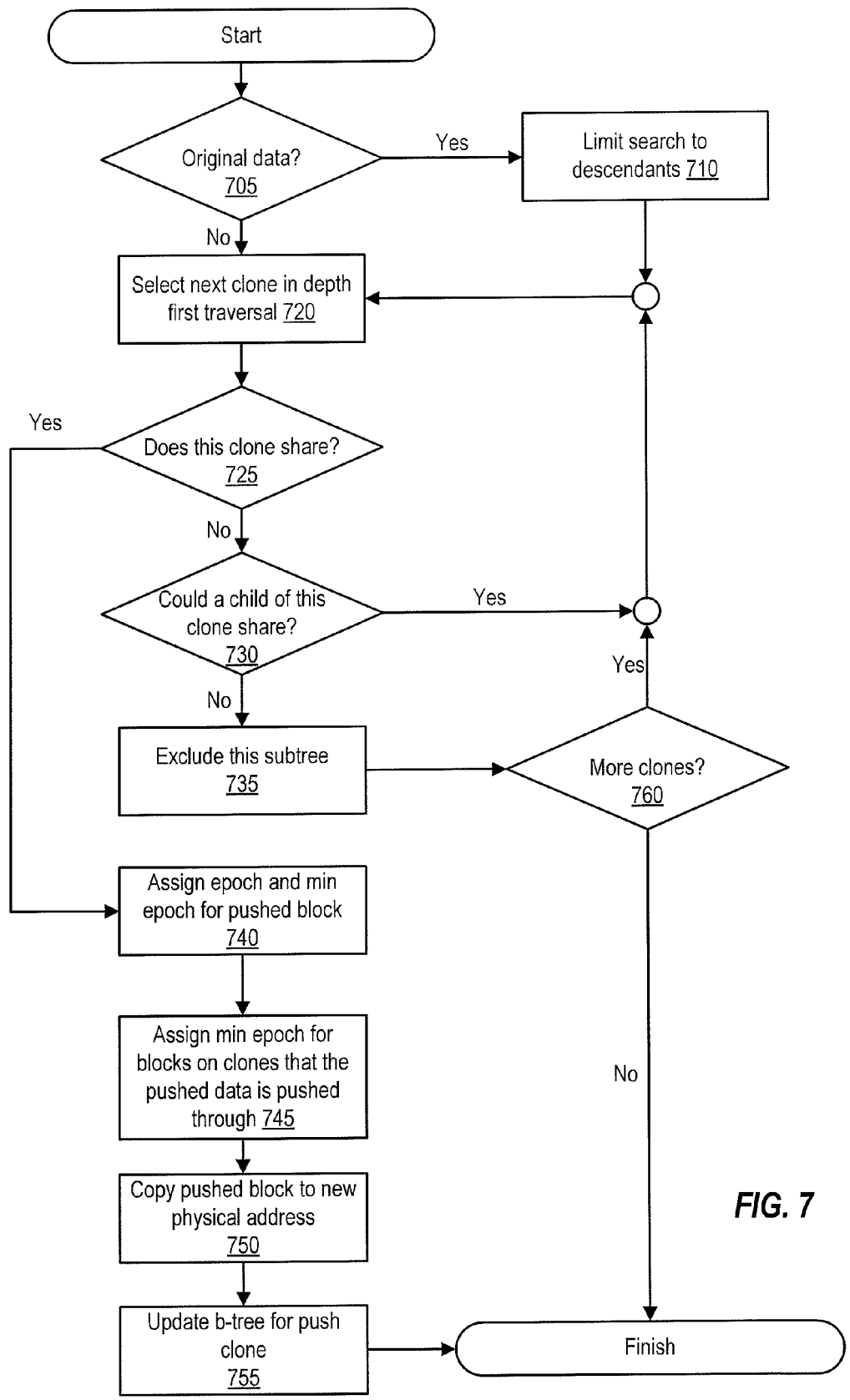
FIG. 7 is a flowchart of a process for pushing a data block of a storage object, according to one embodiment of the present invention.

If the specified LBA has been allocated for the clone, the clone manager pushes the logical block stored at the clone to a child clone that shares the logical block (see FIG. 7). Pushing the data stored at the logical block prior to modifying the logical block allows clones sharing the logical block, if any, to continue to access the logical block's data as the data existed when the sharing clones were created. After push 530 terminates, the method proceeds to write 540.

Figure 6:
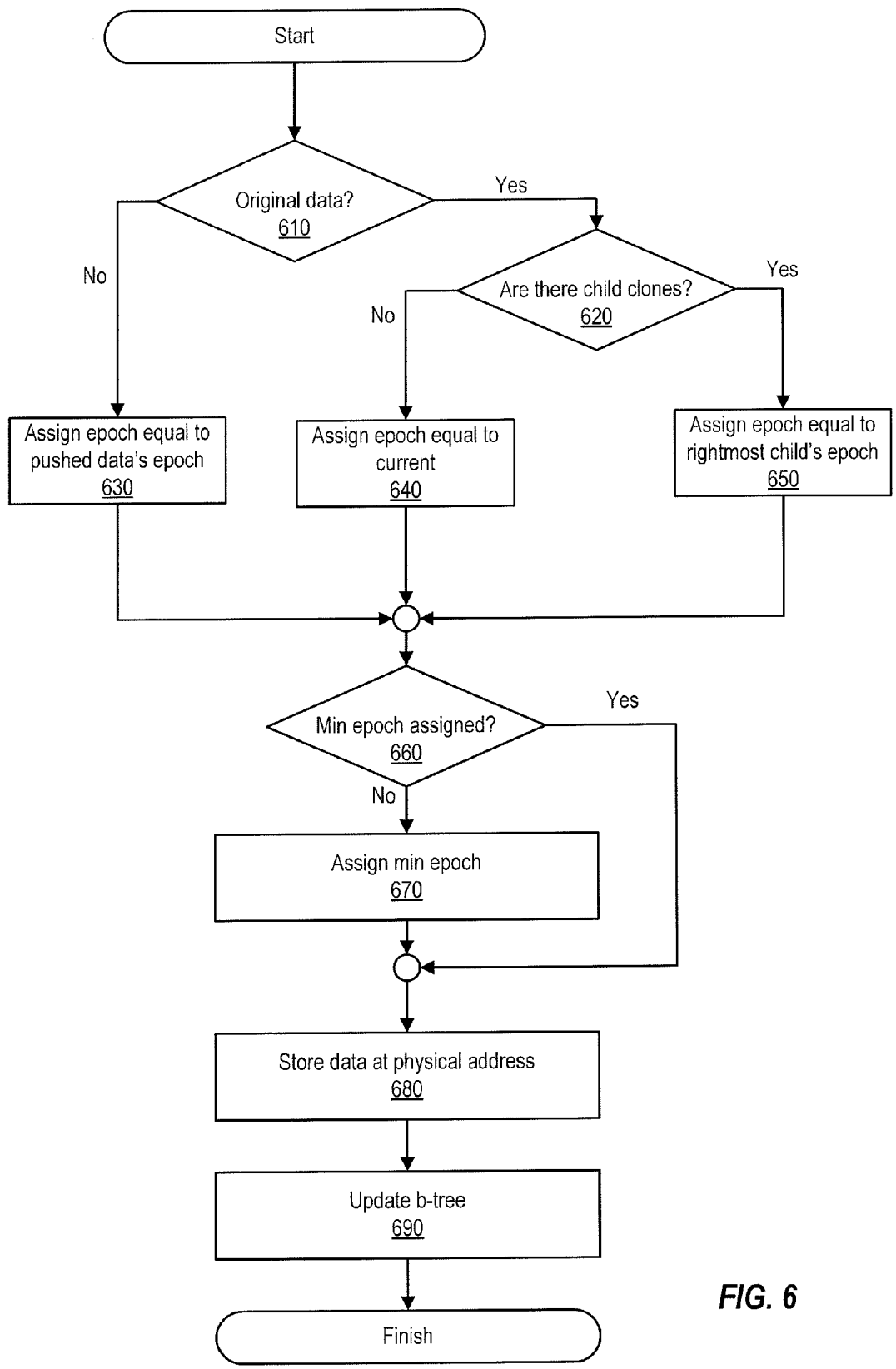
FIG. 6 is a flowchart of a process for writing a data block of a storage object, according to one embodiment of the present invention.

FIG. 6 is a flowchart of a process for writing a logical block of a storage object, according to one embodiment of the present invention. In one embodiment, FIG. 6 is a write process as shown at 540 of FIG. 5. When a clone is initially created, logical-to-physical mappings are unaffected (e.g., logical-to-physical mappings stored in the clone family b-tree leaf nodes in FIG. 3). The newly created clone shares its logical block with the clone's base clone. However, when data is written to the clone a new logical-to-physical mapping is created. In one example, the mapping is stored in a clone family b-tree leaf node (e.g., leaf node 376 of FIG. 3). In this example, the file system application also detects values for min epoch and epoch and stores these values in the clone family b-tree leaf node. In one embodiment, each logical block has a value of epoch and min epoch. In alternative embodiments, epoch and min epoch can be assigned to variable size block ranges. The file system application can use epoch and min epoch to determine where to store data in a system that insures that only one physical copy of a shared logical block is stored.

Two example situations in which a logical block can be written to a clone are: an application, (e.g., file system application 124 of FIG. 1) writes original data to the logical block (e.g., in response to a request to update the clone); and an ancestor clone is updated and the ancestor clone's logical block is pushed to the clone. Epoch and min epoch values assigned to the logical block depend on the situation and can affect future writes and pushes. In either case, a clone manager (such as clone manager 126 of FIG. 1) facilitates writing data to a clone. The clone manager detects which situation is occurring at 610. If the clone manager detects that data is being pushed to a clone from an ancestor clone, at 630 the clone manager assigns an epoch value to the receiving clone's logical block that equals to the epoch value of the logical block on the sending clone (i.e., the logical block brings its epoch value with it).

If the clone manager detects at 610 that a receiving clone's logical block is being written with original data (e.g., in response to an update request, not pushed data), the clone manager detects at 620 whether the receiving clone has any child clones. If not, at 640 the clone manager detects the current value of the epoch counter and assigns that value as the epoch value of the logical block being written. That is, after the write completes, the logical block stored at the LBA specified in the update request (for the clone ID specified) will be associated with this epoch value. If the clone has child clones, at 650 the clone manager assigns the clone ID of the rightmost child clone as the logical block's epoch value. The clone manager stores the epoch value in the epoch field of the clone family b-tree leaf node that stores mappings for the clone. This epoch value is assigned when the logical block's data is written on the clone, and is not updated later, even when the logical block is copied from one clone to another.

If the clone manager detects at 660 that min epoch is not assigned for this LBA, this LBA has not previously had a logical block stored for this clone. The LBA has also not had a logical block pushed through this clone. In this case, at 670 the clone manager stores the min epoch value in the min epoch field of the clone family b-tree leaf node that stores mappings for the clone. The clone manager sets the min epoch value to the same value as the epoch value. If the logical block being written is pushed data (e.g., the logical block is being pushed from an ancestor clone that is being updated), the min epoch for this block address does not change again. Otherwise, the min epoch can change at most one more time when a logical block for this LBA is pushed through this clone. When this happens the min epoch value is set to the epoch value of the pushed through data.

At 660, the clone manager detects whether a min epoch value is assigned for this logical block. If the clone manager detects at 620 that the min epoch value for this LBA for this clone has already been written (e.g., as a result of a logical block being pushed through this clone for the given LBA), the clone manager will not update the min epoch value and the method proceeds to 680. The only time min epoch changes after being assigned, is when data is pushed through a clone. In this example, data is being pushed to a clone, and not through it. Thus, if min epoch is already assigned, it will not be changed.

At 680, the clone manager writes the logical block's data to physical storage. At 690, the clone manager stores the starting physical address in the clone's clone family b-tree leaf node.

FIG. 7 is a flowchart of a process for pushing a data block of a storage object, according to one embodiment of the present invention. A clone manager (such as clone manager 126 of FIG. 1) detects that a clone's logical block is to be pushed (e.g., at 530 of FIG. 5). This occurs, for example, when the clone receives an update and the data state prior to the update needs to be preserved for clones sharing the data. The clone manager detects which clone to push the logical block to, performs the push operation, and updates any metadata entries that need to be updated. In one example, the clone manager receives a request to update a clone. If the clone is storing a logical block, the clone manager will push the logical block prior to updating the clone so that other clones that share the logical block can still access the logical block's non-updated data. The method presumes that there is at least one child clone of the clone from which the logical block is being pushed. Otherwise, the push operation terminates and the logical block is overwritten. Further, if the epoch value of the logical block being pushed is greater than the clone ID of the clone's rightmost child, the push operation terminates as this means that the logical block was written after any child clones and so the child clones do not share the logical block's data.

At 705, the clone manager detects whether the clone's logical block (i.e., the logical block the clone is currently storing) was originally written to the clone (i.e., the clone is the logical block's source) or if the clone's logical block was pushed to the clone. One way to detect whether the clone's logical block is original is to compare the epoch value for the logical block with the corresponding clone ID. If the epoch value is greater than or equal to the clone ID, the clone's logical block is original to that clone. If the clone's logical block is original, the clone manager will not push the clone's logical block to sibling of the clone, but will limit the search to descendants of the clone at 710. If the logical block was previously pushed to the clone, the logical block may be pushed to siblings of the clone.

At 720, the clone manager selects a clone as a candidate recipient of the pushed logical block. The clone manager performs a depth first traversal of the clone family tree to select a candidate clone. A logical block is pushed to the first clone that shares the logical block's data that is visited in a depth first traversal of the clone family tree starting from the clone where the logical block is currently stored. A depth first traversal of a clone family tree proceeds from clone to clone from the root of the clone family tree and explores as far as possible along each branch before backtracking. For example, a depth first traversal of clone family tree 200 of FIG. 2 proceeds 0, 1, 2, 4, 10, 12, 15, 11, 14, 16, 13, 5, 6, 9, 3, 7, 8, 17. The clone manager finds the leftmost child clone that has a clone ID greater than logical block's epoch value. This is the first clone that the clone manager will check at 725 to detect whether the clone shares the logical block. The clone ID is greater than the logical block's epoch value. If the clone ID is smaller than the logical block's epoch value, this indicates that the clone was created before the logical block was written, so the clone does not share the logical block. Only clones created after a logical block's data is written can share that data. At 725, the clone manager detects whether the selected clone shares the logical block. If so, the clone manager will push the logical block to the selected clone and the method proceeds to 740. If not, the clone manager will not push the logical block to the selected clone.

If the selected clone currently stores a logical block corresponding to that being pushed, the clone manager, in order to expedite the process of determining which clone to push a logical block to, can exclude entire subtrees of the clone family tree rather than having to examine each clone in the clone family tree. To detect whether a descendant of the selected clone could share the logical block, at 730 the clone manager compares the min epoch value of the selected clone with the clone ID of the selected clone. If the clone ID of the selected clone is less than the min epoch value of the selected clone, the selected clone was created before it was written to and there were additional clones created (maybe children of this clone) between the time the selected clone was created and the time the selected clone was first written to. These clones could share the logical block being pushed, and so are checked. If the selected clone's min epoch is equal to the selected clone's clone id, then the clone manager excludes the sub-tree rooted at the selected clone from consideration at 735. This equality indicates that the first data written to the clone is the data currently stored at the clone, so the data of the logical block being pushed was not stored there. Also, if the data being pushed were pushed through the selected clone (meaning that the selected clone's descendants should be considered as possible recipients for the pushed data), the selected clone's min epoch value would have been updated to reflect that.

At 760, the clone manager detects whether there are more candidate clones. If not, the push operation terminates. If the clone manager reaches the source of the logical block (detects the logical block's epoch value is greater than or equal to the epoch value of a clone), the logical block is not shared and the push operation terminates. If there are more candidate clones, the clone manager then selects the next clone to consider as the recipient of the logical block being pushed based on the depth first traversal of the clone family tree at 720.

If a selected clone shares the logical block, the clone manager assigns epoch and min epoch for the logical block being pushed at 740. The min epoch and epoch values for the logical block are both set to the epoch value of the logical block being pushed.

At 745, the clone manager assigns the min epoch value for logical blocks having the specified LBA (by the update request) on any clones that the pushed logical block is pushed through. The min epoch value is set to the epoch value of the logical block that is pushed through. If the clone manager subsequently is looking for a shared block (e.g., to read the shared block), the min epoch value indicates whether the block could be shared by one of the pushed through clone's descendants. A logical block's data is pushed through a candidate clone if the clone manager detects that the candidate clone has a logical block allocated for the LBA specified by the update request. Since the LBA is already allocated for the candidate clone, the candidate clone is unable to be the recipient of the pushed data. However, since the candidate clone's logical block (at that LBA) has an epoch value greater than the candidate clone's clone ID, the logical block was written after the candidate clone was created, so the candidate clone's descendants may be able to receive the pushed data. If in fact one of the candidate clone's descendants does become the recipient of the pushed data, the pushed data is "pushed through" the candidate clone. At 750, the clone manager stores the pushed logical block at a physical address. At 755, the clone manager stores the starting physical address in the clone's clone family b-tree leaf node entry for the clone to which the logical block is pushed.

Figure 8:
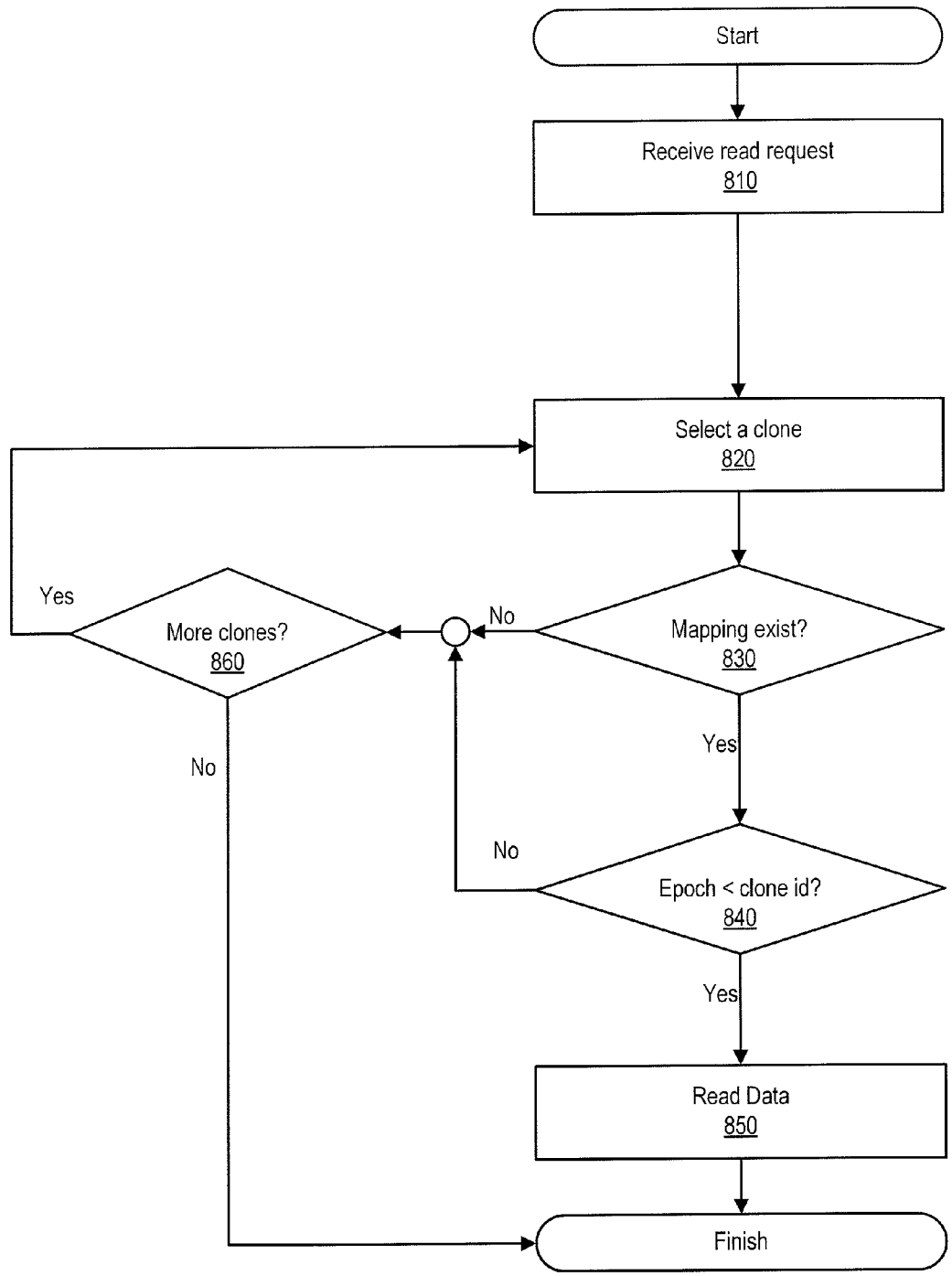
FIG. 8 is a flowchart of reading data from a data block of a storage object, according to one embodiment of the present invention.

FIG. 8 is a flowchart of a read operation from a data block of a shared storage object, according to one embodiment of the present invention. A clone manager (such as clone manager 126 of FIG. 1) receives a read request at 810. The read request specifies a clone ID and a logical block. At 820, the clone manager selects the clone having the specified clone ID. The clone manager detects whether the selected clone stores the specified logical block. Detecting can be performed, for example, by accessing a b-tree leaf node that contains mappings for the specified clone and detecting whether the b-tree leaf node contains a mapping for the specified clone for the LBA of the specified logical block at 830.

If no mapping exists, then the specified clone does not store the requested data and the clone manager detects whether there are more clones at 860. If there are more clones, the clone manager selects another clone at 820. To detect if more clones exist, the clone manager searches the clone family tree in the reverse of the depth first traversal order. By definition, the clone that stores the logical block's data is on the depth-first traversal path from the specified clone to the source clone for the logical block's data. A backward search on the depth-first traversal path to the root clone starting from the specified clone is conducted to find clone that stores the logical block. This is the reverse of the search used for the push operation. First the clone manager checks the parent of the specified clone to detect whether a logical block having the specified LBA is stored by the parent and was created before the specified clone was created, i.e., detect whether the epoch value of the logical block stored at the parent clone is less than the clone ID of the specified clone. If so, then the parent clone's data is shared by the specified clone. Then the data is retrieved from the parent and the read operation terminates.

If the parent has data at the specified LBA and the min epoch for the block is less than the clone ID of the specified clone then the shared data is stored on one of the descendants of the parent The descendant that shares the logical block comes before the specified clone in the depth first traversal starting at the parent. These descendants are searched starting from the left sibling of the specified clone to the leftmost child of the parent clone of the specified clone. If a sibling or its descendants do not have pushed data from the ancestors of the sibling then they are skipped. Otherwise, the pushed logical block is stored on the sibling or one of its descendants. If the pushed logical block is not stored on the sibling then the sibling's descendants are searched starting from the leftmost child of the sibling.

If the parent clone does not have the shared logical block, that is, either the parent clone does not store data at the LBA or the min epoch value for the logical block stored at the LBA is greater than the clone ID of the specified clone, then the search for shared data continues as if the original read operation were done on the parent clone of the specified clone but the parent had no data for the LBA. This process is repeated until the clone at the root is searched.

If the clone manager detects a mapping for a given logical block, the clone manager compares whether the epoch value for the logical block is less than the clone ID at 840. If the epoch is greater than or equal to the clone ID, the logical block stored at the physical address indicated by the mapping was written after the clone was created. This means that the logical block has been updated after the clone was created. Since the read request specified a particular logical block, and that block has been overwritten on this clone, the clone manager will continue looking if the clone manager detects (at 860) that there are more clones. If the clone manager detects (at 840) that the epoch value for the logical block having the specified LBA is less than the clone ID, then the clone manager will read the requested logical block from the mapped physical location at 850.

Figure 9:
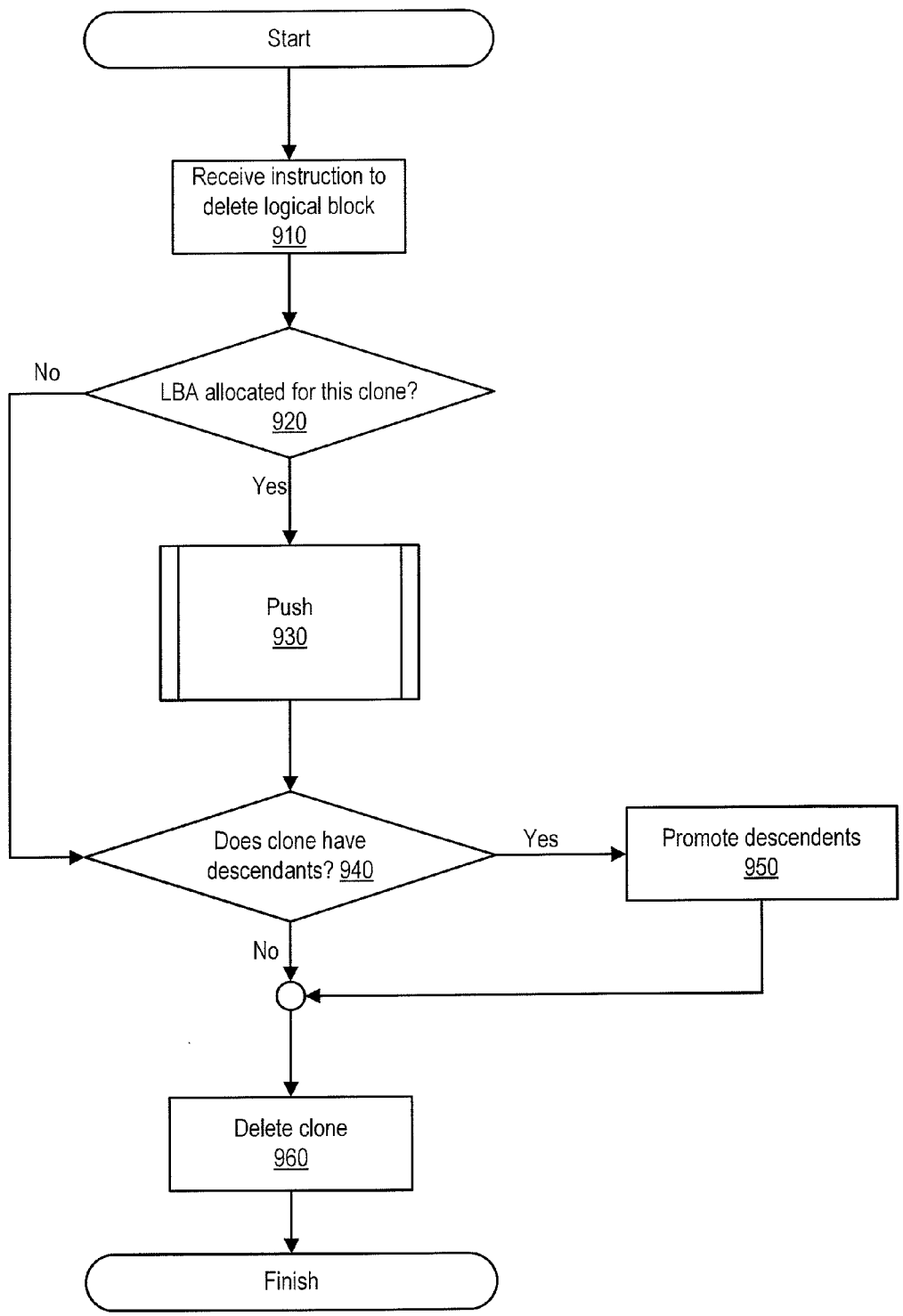
FIG. 9 is a flowchart of deleting a logical block stored on a clone, according to one embodiment of the present invention.

FIG. 9 is a flowchart of deleting a logical block stored on a clone, according to one embodiment of the present invention. A clone manager (such as clone manager 126 of FIG. 1) receives a request to delete a clone at 910. The request specifies a LBA and clone ID. At 920, the clone manager detects whether the LBA is allocated for this clone. If so, at 930 the clone manager pushes the logical block so that clones that share the logical block can continue to access the logical block. Deleting a block of a clone is handled in substantially the same way as overwriting it except that at end of the process the block is deleted instead of overwritten.

If the logical block is not allocated for the clone, the clone manager detects whether the specified clone has descendants at 940. If so, the clone manager promotes the descendants at 950. That is, subsequent to a clone being deleted, the children of the deleted clone become the children of the parent of the deleted clone. At 960, the clone manager deletes the specified clone.

Figure 10:
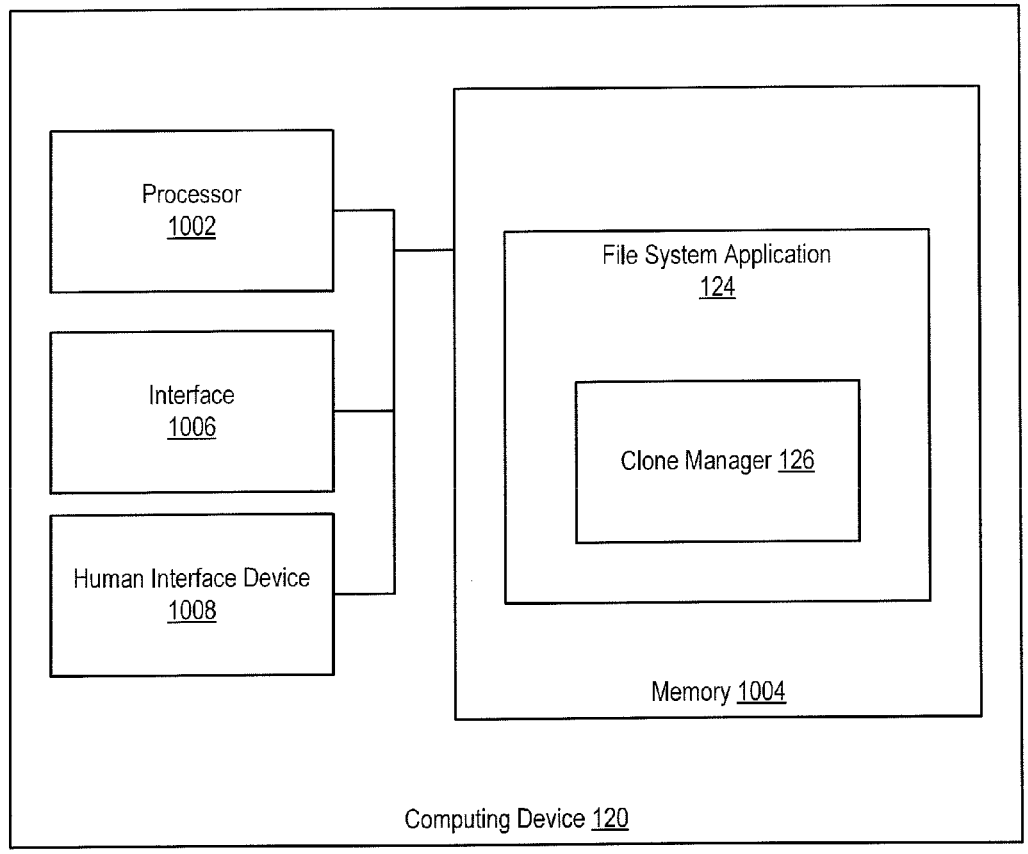
FIG. 10 is a block diagram of a computing device, illustrating how a computing device can implement a clone manager in software, according to one embodiment of the present invention.

FIG. 10 is a block diagram of a computing device 120, illustrating how a clone manager 126 (e.g., clone manager 126 of FIG. 1) can be implemented in software. By executing the software that implements clone manager 126, computing device 120 becomes a special purpose computing device that is configured to store data in a clone family tree, which generates information identifying which clone stores a single copy of a shared logical object.

Computing device 120 can be a personal computer, network appliance, server, personal digital assistant, mobile phone, storage controller (e.g., an array controller, tape drive controller, or hard drive controller), laptop computer, or the like. In general, computing device 120 is configured to execute software or otherwise provide appropriate functionality to act as a component of the system described herein.

As illustrated, computing device 120 includes one or more processors 1002 (e.g., microprocessors, programmable logic devices (PLDs), or application specific integrated circuits (ASICs)) configured to execute program instructions stored in memory 1004. Memory 1004 can include various types of RAM, Read Only Memory (ROM), Flash memory, micro electro-mechanical systems (MEMS) memory, magnetic core memory, and the like. Memory 1004 can include both volatile and non-volatile memory. Computing device 120 also includes one or more interfaces 1006. Processor 1002, interface 1006, and memory 1004 are coupled to send and receive data and control signals by a bus or other interconnect.

Interface 1006 can include a network interface to various networks (e.g., such as network 130 of FIG. 1) and/or interfaces to various peripheral buses. For example, interface 1006 can include a network interface (e.g., implemented as a network interface card) via which messages generated by clone manager 126 can be sent to other devices (e.g., computing device 100 of FIG. 1) in order to, for example, update a logical block stored at a clone. Interface 1006 can also include an interface to one or more storage devices (e.g., on which the clone family tree and/or clone family tree metadata is stored).

In this example, program instructions and data executable to implement all or part of clone manager 126 are stored in memory 1004. Clone manager 126 is shown as being included in file system 124, though in other embodiments clone manager 126 is a standalone module implemented in software and or hardware. Clone manager 126 is configured to create, update, and access data stored in a clone. Clone manager 126 is further configured to access and dynamically update metadata describing the clone family tree and data stored therein.

Human user interface 1008 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting access to a clone's logical object) to and output from (e.g., the data stored in the logical object) clone manager 126 can be received and/or sent via such an input and/or output device.

The program instructions and data implementing clone manager 126 can be stored on various computer readable storage media such as memory 1004. In some embodiments, such software is stored on a computer readable storage medium such as a compact disc (CD), digital versatile disc (DVD), hard disk, optical disk, tape device, floppy disk, and the like). In order to be executed by processor 1002, the instructions and data can be loaded into memory 1004 from the other computer readable storage medium. The instructions and/or data can also be transferred to computing device 120 for storage in memory 1004 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
creating a first clone, wherein
the first clone stores a copy of a storage object;
assigning a first clone identifier to the first clone, wherein
the first clone identifier is a first value of a variable;
incrementing the variable in response to creating the first clone;
creating a second clone, wherein
the second clone shares the copy of the storage object;
assigning a second clone identifier to the second clone, wherein
the second clone identifier is a second value of the variable subsequent to the incrementing the variable;
writing data to a first data block of the storage object;
detecting whether the first clone has any child clones; and
assigning a first epoch value to the first data block, wherein
the first epoch value is equal to the first clone identifier of the first clone if the first clone has no child clones, and
the first epoch value is equal to a clone identifier of first clone's most recently created child clone if the first clone has one or more child clones.

2. The method of claim 1, further comprising:
detecting whether a min epoch value is stored for the first data block; and
writing a first min epoch value for the first data block in response to detecting that no min epoch value is stored for the first data block, wherein
the first min epoch value for the first data block is equal to the epoch value for the first data block, and
the first min epoch value for the first data block indicates the earliest time the first data block was written.

3. The method of claim 2, further comprising
storing the first epoch value and the first min epoch value in a b-tree node, wherein
the b-tree comprises mapping information for the first clone and second clone; and
storing a second epoch value and a second min epoch value in the b-tree node, wherein
the second epoch value and the second min epoch value are assigned to a second data block of the second clone.

4. The method of claim 1, further comprising:
detecting a request to access a second data block, wherein
the request specifies the first clone identifier and a logical block address (LBA); and
detecting whether a b-tree node comprises a mapping for the second data block, wherein
the detecting comprises using a logical block address (LBA) as a primary index, and using the first clone identifier as a secondary index.

5. The method of claim 1, further comprising:
selecting a destination clone of a clone family tree, wherein
the selecting comprises performing a depth-first traversal of a portion of the clone family tree;
pushing first data to the destination clone, wherein
the first data is shared between the destination clone and at least one other clone of the clone family tree,
the pushing comprises updating a b-tree node and copying the first data to a physical storage location specified by the b-tree node, and
the b-tree node stores mapping information for the destination clone.

6. The method of claim 1, further comprising:
receiving a request to delete a specified clone of a clone family tree, wherein
the clone family tree comprises a parent clone of the specified clone and at least one child clone of the specified clone;
deleting the specified clone; and promoting the at least one child clone to become children of the parent clone.

7. The method of claim 1, wherein
the first clone comprises a writeable snapshot of a base storage object.

8. The method of claim 1, wherein
the storage object is at least one of a file or a thin-provisioned volume.

9. A non-transitory computer readable storage medium storing program instructions executable by one or more processors to implement a clone manager, wherein the clone manager is configured to:
 create a first clone, wherein
  the first clone stores a copy of a storage object;
 assign a first clone identifier to the first clone, wherein
  the first clone identifier is a first value of a variable;
 increment the variable in response to creating the first clone;
 create a second clone, wherein
  the second clone shares the copy of the storage object;
 assign a second clone identifier to the second clone, wherein
  the second clone identifier is a second value of the variable subsequent to the incrementing the variable; and
 write data to a first data block of the storage object;
 detect whether the first clone has any child clones; and
 assign a first epoch value to the first data block, wherein
  the first epoch value is equal to the first clone identifier of the first clone if the first clone has no child clones, and
  the first epoch value is equal to a clone identifier of first clone's most recently created child clone if the first clone has one or more child clones.

10. The non-transitory computer readable storage medium of claim 9, wherein the clone manager is further configured to:
 detect whether a min epoch value is stored for the first data block; and
 write a first min epoch value for the first data block in response to detecting that no min epoch value is stored for the first data block, wherein
  the first min epoch value for the first data block is equal to the epoch value for the first data block, and
  the first min epoch value for the first data block indicates the earliest time the first data block was written.

11. The non-transitory computer readable storage medium of claim 10, wherein the clone manager is further configured to:
 store the first epoch value and the first min epoch value in a b-tree node, wherein
  the b-tree comprises mapping information for the first clone and second clone; and
 store a second epoch value and a second min epoch value in the b-tree node, wherein
  the second epoch value and the second min epoch value are assigned to a second data block of the second clone.

12. The non-transitory computer readable storage medium of claim 9, wherein the clone manager is further configured to:
 detect a request to access a second data block, wherein
  the request specifies the first clone identifier and a logical block address (LBA); and
 detect whether a b-tree node comprises a mapping for the second data block, wherein
  the detecting comprises using a logical block address (LBA) as a primary index, and using the first clone identifier as a secondary index.

13. The non-transitory computer readable storage medium of claim 9, wherein the clone manager is further configured to: select a destination clone of a clone family tree, wherein
 the selecting comprises performing a depth-first traversal of a portion of the clone family tree;
 push first data to the destination clone, wherein
  the first data is shared between the destination clone and at least one other clone of the clone family tree;
 pushing the first data comprises updating a b-tree node and copying the first data to a physical storage location specified by the b-tree node, and
 the b-tree node stored mapping information for the destination clone.

14. A system, comprising:
 one or more processors; and
 a memory coupled to the one or more processors, the memory storing program instructions executable by the one or more processors to implement a clone manager, wherein the clone manager is configured to:
  create a first clone, wherein
   the first clone stores a copy of a storage object;
  assign a first clone identifier to the first clone, wherein
   the first clone identifier is a first value of a variable;
  increment the variable in response to creating the first clone;
  create a second clone, wherein
   the second clone shares the copy of the storage object;
  assign a second clone identifier to the second clone, wherein
   the second clone identifier is a second value of the variable subsequent to the incrementing the variable;
  write data to a first data block of the storage object;
  detect whether the first clone has any child clones; and
  assign a first epoch value to the first data block, wherein
   the first epoch value is equal to the first clone identifier of the first clone if the first clone has no child clones, and
   the first epoch value is equal to a clone identifier of first clone's most recently created child clone if the first clone has one or more child clones.

15. The system of claim 14, wherein the clone manager is further configured to:
 detect whether a min epoch value is stored for the first data block; and
 write a first min epoch value for the first data block in response to detecting that no min epoch value is stored for the first data block, wherein
  the first min epoch value for the first data block is equal to the epoch value for the first data block, and
  the first min epoch value for the first data block indicates the earliest time the first data block was written.

16. The system of claim 15, wherein the clone manager is further configured to:
 store the first epoch value and the first min epoch value in a b-tree node, wherein
  the b-tree comprises mapping information for the first clone and second clone; and
 store a second epoch value and a second min epoch value in the b-tree node, wherein
  the second epoch value and the second min epoch value are assigned to a second data block of the second clone.

17. The system of claim 14, wherein the clone manager is further configured to:
 select a destination clone of a clone family tree, wherein the selecting comprises performing a depth-first traversal of a portion of the clone family tree;
push first data to the destination clone, wherein the first data is shared between the destination clone and at least one other clone of the clone family tree, the pushing comprises updating a b-tree node and copying the first data to a physical storage location specified by the b-tree node, and
the b-tree node stored mapping information for the destination clone.

* * * * *